United States Patent
Nishizawa

(10) Patent No.: US 8,649,931 B2
(45) Date of Patent: Feb. 11, 2014

(54) COOLING SYSTEM FOR VEHICLE

(75) Inventor: Jun Nishizawa, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/581,670

(22) PCT Filed: Mar. 4, 2011

(86) PCT No.: PCT/JP2011/055070
§ 371 (c)(1),
(2), (4) Date: Aug. 29, 2012

(87) PCT Pub. No.: WO2012/120592
PCT Pub. Date: Sep. 13, 2012

(65) Prior Publication Data
US 2013/0030643 A1    Jan. 31, 2013

(51) Int. Cl.
*G01M 17/00* (2006.01)
*G01F 1/86* (2006.01)
*G01F 1/34* (2006.01)

(52) U.S. Cl.
USPC .... 701/32.8; 701/29.1; 73/861.01; 73/861.42

(58) Field of Classification Search
USPC ................. 701/29.1, 32.8; 73/861.01, 861.42
See application file for complete search history.

(56) References Cited

U.S. PATENT DOCUMENTS

| | | | |
|---|---|---|---|
| 7,296,543 B2 * | 11/2007 | Namuduri et al. | 123/41.44 |
| 2006/0196634 A1 * | 9/2006 | Sato et al. | 165/41 |
| 2008/0201034 A1 * | 8/2008 | Eiraku et al. | 701/29 |
| 2009/0139317 A1 * | 6/2009 | Deivasigamani | 73/114.31 |
| 2010/0089170 A1 * | 4/2010 | Reginaldo et al. | 73/861.11 |
| 2011/0125361 A1 * | 5/2011 | Weber et al. | 701/29 |

FOREIGN PATENT DOCUMENTS

| | | |
|---|---|---|
| JP | 2004-76647 A | 3/2004 |
| JP | 2005-180225 A | 7/2005 |
| JP | 2009-46077 A | 3/2009 |
| JP | 2009-221874 A | 10/2009 |
| JP | 2009-244184 A | 10/2009 |
| JP | 2010-124628 A | 6/2010 |

* cited by examiner

*Primary Examiner* — Thomas Black
*Assistant Examiner* — Tyler Paige
(74) *Attorney, Agent, or Firm* — Sughrue Mion, PLLC

(57) ABSTRACT

A vehicle cooling system includes: a channel allowing a liquid medium cooling a drive device of the vehicle to circulate; a flow rate detection unit detecting a flow rate of the liquid medium flowing in the channel; a temperature sensor detecting a temperature of the liquid medium; a pump provided on the channel for circulating the liquid medium; a rotational speed sensor detecting a rotational speed of the pump; and a control device controlling drive of the pump. The control device identifies a malfunctioning part of the cooling system based on the flow rate and the temperature of the liquid medium and the rotational speed of the pump. Thus, since abnormalities of the cooling mechanism can be detected with higher precision so that the abnormalities are distinguished from each other, it is a limited part that should be checked when repairs are made and the work efficiency is improved.

4 Claims, 4 Drawing Sheets

FIG.3

| COOLANT TEMPERATURE | ROTATIONAL SPEED | FLOW RATE | POSSIBLE ABNORMALITIES | METHOD FOR VERIFICATION |
|---|---|---|---|---|
| NORMAL | NORMAL | NORMAL | NONE | — |
| NORMAL | NORMAL | ABNORMAL (FALL) | DETERIORATED FLOW RESISTANCE | TEMPORARILY CHANGE W/P ROTATION AND OBSERVE FLOW RATE CHANGE |
| NORMAL | ABNORMAL LOW ROTATIONAL SPEED | ABNORMAL (FALL) | ABNORMALITY OF OR ABNORMAL CONTROL OF W/P | CHECK W/P CURRENT, W/P TEMPERATURE |
| ABNORMAL HIGH TEMPERATURE | NORMAL | NORMAL | LARGE HEAT GENERATION OR ABNORMAL HEAT DISSIPATION OR ABNORMALITY OF COOLANT TEMPERATURE SENSOR | THROUGH COMMUNICATION BETWEEN ECU, OPERATE RADIATOR FAN/CHECK WHETHER ABNORMALITY HAS OCCURRED TO INVERTER |

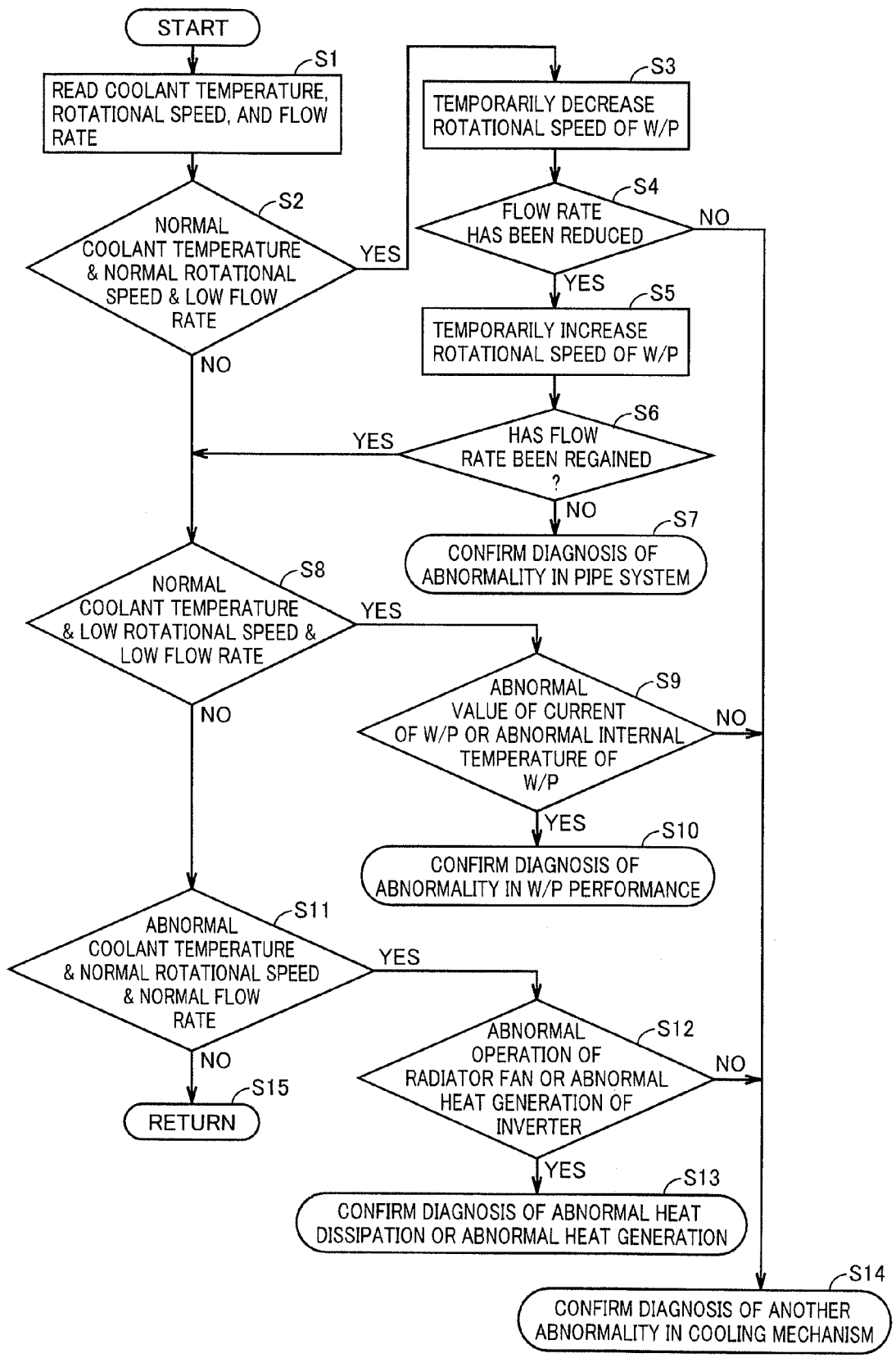

COOLING SYSTEM FOR VEHICLE

CROSS REFERENCE TO RELATED APPLICATIONS

This application is a National Stage of International Application No. PCT/JP2011/055070, filed on Mar. 4, 2011, the contents of all of which are incorporated herein by reference in their entirety.

TECHNICAL FIELD

The present invention relates to a cooling system for vehicles, and particularly to a cooling system for vehicles that has a control device identifying a malfunctioning part of the cooling system.

BACKGROUND ART

As an example of the technique for making a determination that a failure has occurred to a cooling mechanism of a vehicle, an abnormality determination apparatus is disclosed in Japanese Patent Laying-Open No. 2009-46077 (PTL 1). This abnormality determination apparatus prevents an erroneous determination that the drive state of an electric water pump is abnormal in spite of the fact that the drive state is normal.

Specifically, when the engine is stopped, an electronic control device pressure-feeds a coolant to a heater core provided in a flow channel extending from the electric pump to the engine. When the temperature of the coolant in the heater core is lower by a predetermined value or more than the temperature of the coolant in the engine, the control device determines that the drive state of the electric pump is abnormal.

CITATION LIST

Patent Literature

PTL 1: Japanese Patent Laying-Open No. 2009-46077
PTL 2: Japanese Patent Laying-Open No. 2009-221874
PTL 3: Japanese Patent Laying-Open No. 2004-76647

SUMMARY OF INVENTION

Technical Problem

The abnormality determination apparatus disclosed in Japanese Patent Laying-Open No. 2009-46077 is adapted to the determination that an abnormality has occurred to the water pump, among abnormalities of the cooling mechanism. Thus, if an abnormality occurs to any of other parts, the apparatus is unable to detect this abnormality as being distinguished from the abnormality of the water pump. By way of example, abnormalities of the cooling mechanism include an abnormality of a control signal for the water pump, an abnormality occurring to the hardware of the water pump itself, an abnormality of the flow channel, and an abnormality of the heat dissipation system. It has therefore been troublesome to identify a failed part, in such a case where repairs were to be done.

An object of the present invention is to provide a cooling system for vehicles that is capable of detecting abnormalities of the cooling mechanism with higher precision in such a manner that the abnormalities are distinguished from each other.

Solution to Problem

In summary, the present invention is a cooling system for a vehicle, and includes: a channel allowing a liquid medium cooling a drive device of the vehicle to circulate; a flow rate detection unit detecting a flow rate of the liquid medium flowing in the channel; a temperature sensor detecting a temperature of the liquid medium; a pump provided on the channel for circulating the liquid medium; a rotational speed sensor detecting a rotational speed of the pump; and a control device controlling drive of the pump. The control device identifies a malfunctioning part of the cooling system based on the flow rate of the liquid medium, the temperature of the liquid medium, and the rotational speed of the pump.

Preferably, in a case where the temperature of the liquid medium and the rotational speed of the pump are normal and the flow rate of the liquid medium is smaller than a normal value, the control device temporarily increases the rotational speed of the pump and, when the flow rate subsequently fails to return to the normal value, the control device identifies the channel as the malfunctioning part.

Preferably, in a case where the temperature of the liquid medium is normal, the rotational speed of the pump is smaller than a normal value, and the flow rate of the liquid medium is smaller than a normal value, the control device identifies the pump as the malfunctioning part.

Preferably, the cooling system further includes: a radiator provided on the channel; and a fan for blowing air to the radiator. In a case where the temperature of the liquid medium is abnormal and the rotational speed of the pump and the flow rate of the liquid medium are normal, the control device detects a heat-generation or heat-dissipation abnormality based on an operating state of the fan and an inverter temperature.

Advantageous Effects of Invention

According to the present invention, abnormalities of the cooling mechanism can be detected with higher precision in such a manner that the abnormalities are distinguished from each other, and therefore, it is a limited part that should be checked when repairs are to be made thereon and the work efficiency is improved.

BRIEF DESCRIPTION OF DRAWINGS

FIG. 3 is a diagram showing possible abnormalities that are considered to occur based on the coolant temperature, the rotational speed of the pump, and the flow rate, as well as how to verify them.
FIG. 4 is a flowchart for illustrating a diagnostic process performed by a control device 30 in FIG. 1.

DESCRIPTION OF EMBODIMENTS

Figure 1:
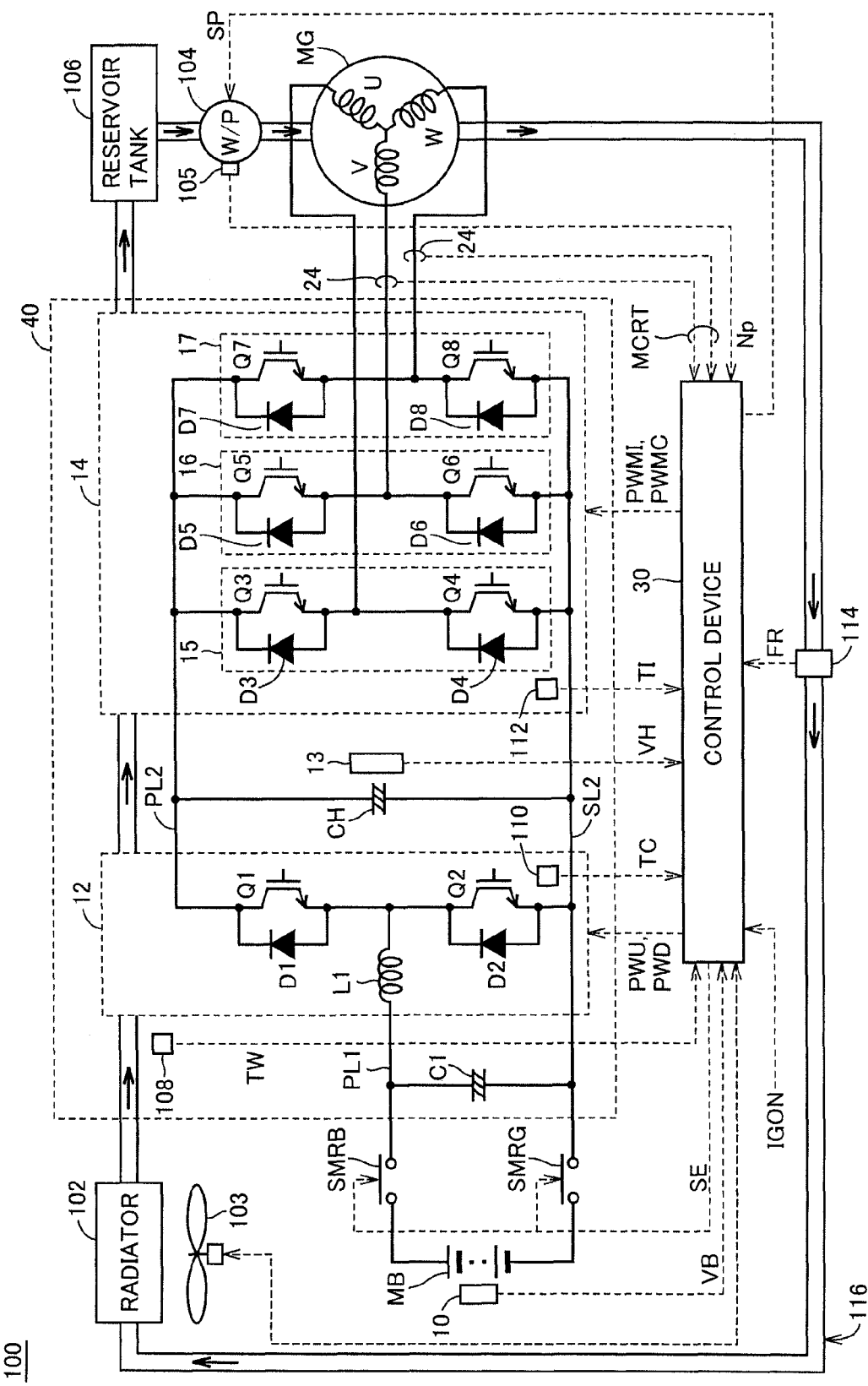
FIG. 1 is a circuit diagram showing a configuration of a vehicle 100 mounted with a cooling system for the vehicle.

An embodiment of the present invention will hereinafter be described in detail with reference to the drawings. In the drawings, the same or corresponding components are denoted by the same reference characters, and a description thereof will not be repeated.

FIG. 1 is a circuit diagram showing a configuration of a vehicle 100 mounted with a cooling system for the vehicle.

[Description of Drive System]

Referring to FIG. 1, vehicle 100 includes a battery MB which is a power storage device, a voltage sensor 10, a power control unit (PCU) 40, a motor generator MG, and a control device 30. PCU 40 includes a voltage converter 12, smoothing capacitors C1, CH, a voltage sensor 13, and an inverter 14. Vehicle 100 further includes a positive bus PL2 for feeding electric power to inverter 14 which drives motor generator MG.

Smoothing capacitor C1 is connected between a positive bus PL1 and a negative bus SL2. Voltage converter 12 boosts a voltage between the terminals of smoothing capacitor C1. Smoothing capacitor CH smoothes the voltage boosted by voltage converter 12. Voltage sensor 13 detects a voltage VH between the terminals of smoothing capacitor CH and outputs the detected voltage to control device 30.

Vehicle 100 further includes a system main relay SMRB connected between the positive terminal of battery MB and positive bus PL1, and a system main relay SMRG connected between the negative terminal of battery MB (negative bus SL1) and a node N2.

The conduction/nonconduction state of system main relays SMRB, SMRG is controlled in response to a control signal SE provided from control device 30. Voltage sensor 10 measures a voltage VB between the terminals of battery MB. A current sensor (not shown) detecting current IB which flows in battery MB is provided together with voltage sensor 10, for monitoring the state of charge of battery MB.

As battery MB, a secondary battery such as lead-acid battery, nickel-metal hydride battery, or lithium ion battery, or a large-capacity capacitor such as electric double-layer capacitor may be used. Negative bus SL2 extends through voltage converter 12 toward inverter 14.

Voltage converter 12 is a voltage conversion device provided between battery MB and positive bus PL2 for making a voltage conversion. Voltage converter 12 includes a reactor L1 having one end connected to positive bus PL1, IGBT elements Q1, Q2 connected in series between positive bus PL2 and negative bus SL2, and diodes D1, D2 connected in parallel with IGBT elements Q1, Q2, respectively.

Reactor L1 has the other end connected to the emitter of IGBT element Q1 and the collector of IGBT element Q2. Diode D1 has its cathode connected to the collector of IGBT element Q1, and diode D1 has its anode connected to the emitter of IGBT element Q1. Diode D2 has its cathode connected to the collector of IGBT element Q2, and diode D2 has its anode connected to the emitter of IGBT element Q2.

Inverter 14 is connected to positive bus PL2 and negative bus SL2. Inverter 14 converts a DC voltage which is output from voltage converter 12 into a three-phase AC voltage and outputs it to motor generator MG which drives a wheel 2. Further, as the vehicle is regeneratively braked, inverter 14 feeds the electric power generated by motor generator MG back to voltage converter 12. At this time, voltage converter 12 is controlled by control device 30 so that the voltage converter operates as a voltage step-down circuit.

Inverter 14 includes a U phase arm 15, a V phase arm 16, and a W phase arm 17. U phase arm 15, V phase arm 16, and W phase arm 17 are connected in parallel between positive bus PL2 and negative bus SL2.

U phase arm 15 includes IGBT elements Q3, Q4 connected in series between positive bus PL2 and negative bus SL2, and diodes D3, D4 connected in parallel with IGBT elements Q3, Q4 respectively. Diode D3 has its cathode connected to the collector of IGBT element Q3, and diode D3 has its anode connected to the emitter of IGBT element Q3. Diode D4 has its cathode connected to the collector of IGBT element Q4, and diode D4 has its anode connected to the emitter of IGBT element Q4.

V phase arm 16 includes IGBT elements Q5, Q6 connected in series between positive bus PL2 and negative bus SL2, and diodes D5, D6 connected in parallel with IGBT elements Q5, Q6 respectively. Diode D5 has its cathode connected to the collector of IGBT element Q5, and diode D5 has its anode connected to the emitter of IGBT element Q5. Diode D6 has its cathode connected to the collector of IGBT element Q6, and diode D6 has its anode connected to the emitter of IGBT element Q6.

W phase arm 17 includes IGBT elements Q7, Q8 connected in series between positive bus PL2 and negative bus SL2, and diodes D7, D8 connected in parallel with IGBT elements Q7, Q8 respectively. Diode D7 has its cathode connected to the collector of IGBT element Q7, and diode D7 has its anode connected to the emitter of IGBT element Q7. Diode D8 has its cathode connected to the collector of IGBT element Q8, and diode D8 has its anode connected to the emitter of IGBT element Q8.

Motor generator MG is a three-phase permanent-magnet synchronous motor, and three stator coils of the U, V, and W phases have respective ends connected together to a neutral point. The other end of the U phase coil is connected to a line drawn from a connection node of IGBT elements Q3, Q4. The other end of the V phase coil is connected to a line drawn from a connection node of IGBT elements Q5, Q6. The other end of the W phase coil is connected to a line drawn from a connection node of IGBT elements Q7, Q8.

A current sensor 24 detects the current flowing in motor generator MG as a motor current value MCRT, and outputs motor current value MCRT to control device 30.

Control device 30 receives each torque command value and the rotational speed of motor generator MG, respective values of current IB and voltages VB, VH, motor current value MCRT, and a start signal IGON. Control device 30 outputs, to voltage converter 12, a control signal PWU for giving an instruction to step up the voltage, a control signal PWD for giving an instruction to step down the voltage, and a shutdown signal for giving an instruction to inhibit operation.

Further, control device 30 outputs, to inverter 14, a control signal PWMI for giving a drive instruction so that a DC voltage which is output from voltage converter 12 is converted into an AC voltage for driving motor generator MG, and a control signal PWMC for giving a regenerative brake instruction so that an AC voltage generated by motor generator MG is converted into a DC voltage and the DC voltage is fed back to voltage converter 12.

[Description of Cooling Mechanism]

Referring again to FIG. 1, vehicle 100 includes, as components of the cooling mechanism for cooling PCU 40 and motor generator MG, a radiator 102, a reservoir tank 106, and a water pump 104.

Radiator 102, PCU 40, reservoir tank 106, water pump 104, and motor generator MG are annularly connected in series by a flow channel. The flow channel is provided with a flow rate sensor 114, and a flow rate FR is transmitted to control device 30. Instead of flow rate sensor 114, another method for estimating the flow rate of the coolant may be used.

Water pump 104 is a pump for circulating the coolant such as antifreeze, and causes the coolant to circulate in the direction indicated by arrows shown in the drawing. Radiator 102 receives from the flow channel the coolant having cooled voltage converter 12 and inverter 14 in PCU 40, and cools the received coolant by means of a radiator fan 103.

In the vicinity of the coolant inlet of PCU 40, a temperature sensor 108 that measures the coolant temperature is provided. A coolant temperature TW is transmitted from temperature sensor 108 to control device 30. Further, in PCU 40, a temperature sensor 110 detecting a temperature TC of voltage converter 12 and a temperature sensor 112 detecting a temperature TI of inverter 14 are provided. As temperature sensors 110, 112 each, a temperature detection device or the like contained in an intelligent power module is used.

Control device 30 generates a signal SP for driving water pump 104, based on temperature TC from temperature sensor 110 and temperature TI from temperature sensor 112, and outputs the generated signal SP to water pump 104.

The configuration shown in FIG. 1 is provided with flow rate sensor 114 detecting the flow rate of the coolant which has not been detected conventionally. While a failure could have conventionally been identified merely as an abnormality of the cooling mechanism, the flow rate can be detected to identify a more specific part where the failure has occurred, as will be described later herein with reference to FIG. 2 and the following drawings. It should be noted that a similar effect can be obtained, even if flow rate sensor 114 is not provided, by estimating the flow rate by means of another method.

Figure 2:
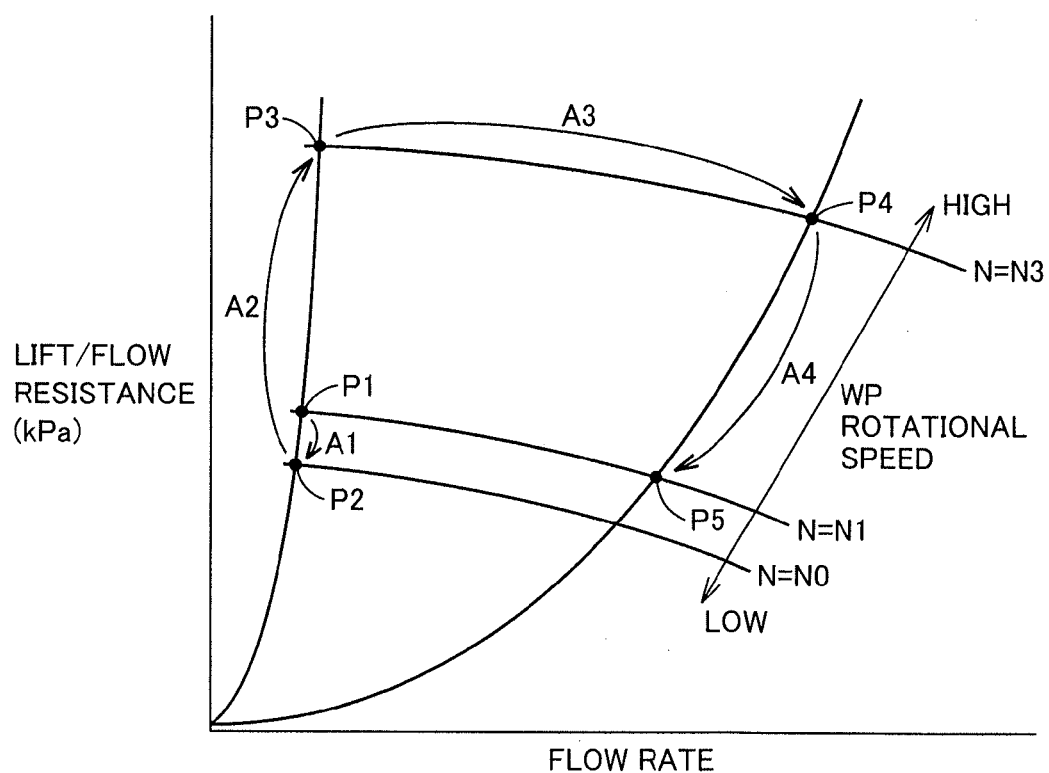
FIG. 2 is a diagram showing a relation between the flow resistance of the cooling mechanism and the flow rate.

FIG. 2 is a diagram showing a relation between the flow resistance of the cooling mechanism and the flow rate.

Referring to FIG. 2, the flow resistance (kPa) of the cooling mechanism is indicated by the vertical axis, and the flow rate (L/min) of a refrigerant such as coolant is indicated by the horizontal axis. If the flow resistance of the cooling mechanism and the flow rate have a normal relation therebetween, an increase/decrease of the flow rate is accompanied by a change of the flow resistance (kPa) along a curve passing through a point P4 and a point P5. If, however, the flow channel for example of the cooling mechanism is clogged with a foreign matter (such as rust), the flow resistance increases. In this case, an increase/decrease of the flow rate causes the flow resistance (kPa) to change along a line passing through a point P1, a point P2, and a point P3.

Here, FIG. 2 also shows a relation between the rotational speed of the water pump, the flow rate, and the flow resistance. It shows that, as compared with the case where the rotational speed N is N0, namely N=N0, the flow resistance is larger when rotational speed N is a higher rotational speed N1, N=N1, and the flow resistance is still more larger when the rotational speed N is a still more higher rotational speed N3, N=N3.

Here, it is supposed that a failure is occurring where a foreign matter is caught in the flow channel to increase the flow resistance. In the case where rotational speed N of water pump 104 is N1, N=N1, although the normal operating point is point P5 in FIG. 2, the operating point is point P1 when a failure occurs. The rotational speed and the flow rate satisfy a certain relation therebetween. Therefore, when control device 30 detects that the flow rate becomes lower than the normal flow rate, control device 30 reduces rotational speed N of the water pump to N0 at operating point P1, in order to identify where the failure occurs. At this time, if the flow rate accordingly decreases as indicated by an arrow A1, the flow resistance may have increased due to the foreign matter.

In view of the above, control device 30 in FIG. 1 changes control signal SP for water pump 104 to increase the rotational speed to N3. If the foreign matter is still caught in the flow channel, the operating point moves to point P3 as indicated by an arrow A2. Here, in the case where the increased flow resistance causes the foreign matter to be removed, the flow rate is regained and the operating point moves to point P4 as indicated by an arrow A3. When the fact that the flow rate is regained can be detected by the flow rate sensor, the control device changes control signal SP for water pump 104 to set the rotational speed back to N1.

Thus, in some cases, the abnormal operating point P1 can be returned to the normal operating point P5.

In the case where any failure different from the above one occurs, a part which causes the failure can be identified as well.

FIG. 3 is a diagram showing possible abnormalities that are considered to occur based on the coolant temperature, the rotational speed of the pump, and the flow rate, as well as how to verify them.

Referring to FIG. 3, an abnormality of the cooling mechanism has conventionally been found based on the coolant temperature and the rotational speed of the pump. In the present embodiment, the flow rate is added as an input parameter so that a more specific part where the abnormality has occurred can be identified.

First, as shown in the first row in FIG. 3, if the coolant temperature, the rotational speed, and the flow rate are all normal, there is no possible failure. Here, the criterion for judging whether normal or abnormal is determined as appropriate by an experiment for example. From a comparison between a threshold value corresponding to this criterion and each input parameter, whether normal or abnormal is determined.

Next, as shown in the second row in FIG. 3, in the case where the coolant temperature and the rotational speed are normal and the flow rate is abnormal (falls), a possible abnormality is deterioration of the flow resistance. In this case, control device 30 temporarily changes the rotations of water pump 104 and observes how the flow rate changes. Then, as a result of the observation of how the flow rate changes from operating point P1 in FIG. 2, if the operating point moves along the line extending from point P2 to point P3, control device 30 determines that the flow resistance has deteriorated. In this case, control device 30 causes water pump 104 to rotate at a higher speed so that the operating point moves toward point P3 and thus tries to improve the state where a foreign matter is caught and remains in the flow channel. If the foreign matter is moved and the flow rate returns to the original state, control device 30 causes the rotational speed to return to its original speed. If the flow rate does not return to its original state, control device 30 confirms the diagnosis that the abnormality has occurred to the pipe system.

As shown in the third row in FIG. 3, in the case where the coolant temperature is normal, the rotational speed is an abnormal low rotational speed, and the flow rate is also abnormal (falls), an abnormality is considered as occurring to water pump 104 or to control of water pump 104. In this case, control device 30 observes the current of water pump 104 and/or the temperature of water pump 104. If control device 30 finds an abnormality such as abnormal heat generation or overcurrent for example, control device 30 determines that an abnormality has occurred to the pump itself. If the current and the temperature have no abnormality, control device 30 determines that an abnormality has occurred to a different part of the cooling mechanism.

Further, as shown in the fourth row in FIG. 3, in the case where the coolant temperature is an abnormal high temperature while the rotational speed and the flow rate are normal, an abnormality is considered as large heat generation of the inverter or converter to be cooled, or abnormal heat dissipation from the radiator, or an abnormality of the coolant temperature sensor. In this case, control device 30 may operate the radiator fan to determine whether the fan rotates or not, or determines whether or not an abnormality of the inverter or converter has already been detected. FIG. 3 shows a case where control device 30 includes a plurality of ECUs. In this case, control device 30 operates utilizing communication between the ECUs in the following manner. Specifically, an ECU that determines whether an abnormality occurs to the cooling mechanism may give a command to an ECU that controls the radiator fan, to change the rotational speed of the fan, or the ECU which determines whether an abnormality occurs to the cooling mechanism may obtain information about inverter's abnormality from a motor ECU that directly controls the inverter and/or converter.

FIG. 4 is a flowchart for illustrating a diagnostic process performed by control device 30 in FIG. 1. The process in this flowchart is called from a main routine and executed, at certain time intervals or each time a predetermined condition is satisfied.

Referring to FIGS. 1 and 4, the start of the process is followed by step S1 in which control device 30 reads coolant temperature TW from temperature sensor 108, reads rotational speed Np of water pump 104 from rotation sensor 105, and reads flow rate FR from flow rate sensor 114.

In step S2, control device 30 determines whether or not a condition that coolant temperature TW is normal, rotational speed Np is normal, and flow rate FR is low is satisfied. "Normal" means that the numerical value falls in the range between predetermined upper and lower limits for example. "Low" means that the numerical value is smaller than a lower limit of a predetermined normal range.

In the case where the condition in step S2 is satisfied, the process proceeds from step S2 to step S3. In step S3, control device 30 changes control signal SP so that rotational speed Np of water pump 104 is temporarily reduced.

In step S4, in the case where flow rate FR obtained from flow rate sensor 114 is not accordingly decreased in response to the reduced rotational speed, the process proceeds to step S14. In contrast, in the case where flow rate FR obtained from flow rate sensor 114 is accordingly decreased in response to the reduced rotational speed, the process proceeds to step S5.

In the case where the process proceeds to step S5, the operating point in FIG. 2 is considered as moving from point P1 to point P2. At this time, the failure is assumed to be an abnormality of the pipe system (for example, the pipe is clogged with a foreign manner and accordingly has a reduced cross section). Before the diagnosis that the abnormality has occurred to the pipe system is confirmed, a try is made to allow the abnormal pipe system (clogged with a foreign matter for example) to change back to its original state by temporarily increasing rotational speed Np of water pump 104 to increase the flow rate.

In step S6, control device 30 determines whether or not flow rate FR has returned to its normal state. This determination may be made based on whether the operating point is point P3 (abnormal) or point P4 (normal) in FIG. 2. In the normal state, rotational speed Np of water pump 104 and flow rate FR satisfy the relation represented by the curve passing through points P4 and P5. It is therefore easy to define in advance the normal range of flow rate FR relative to rotational speed Np.

In step S6, in the case where the flow rate has returned to the normal flow rate, the abnormal state of the pipe system is considered as being returned to the normal state. Therefore, the process proceeds in the same way as the case where the outcome of step S2 is "NO" and thus proceeds to step S8. In contrast, in the case where the flow rate has not returned to its normal state in step S6, the process proceeds to step S7 in which the diagnosis that the abnormality has occurred to the pipe system is confirmed. The result of the diagnosis may be conveyed at this time to an operator, or stored in a nonvolatile memory or the like and later read and analyzed in a repair shop.

In step S8, control device 30 determines whether or not a condition that coolant temperature TW is normal, rotational speed Np is low, and flow rate RF is low is satisfied. "Normal" means for example that the numerical value falls in the range between predetermined upper and lower limits. "Low" means that the numerical value is smaller than a lower limit of a predetermined normal range.

In the case where the condition in step S8 is satisfied, the process proceeds from step S8 to step S9. Otherwise, the process proceeds to step S11.

In step S9, it is determined whether or not an abnormality has occurred to the value of the current of water pump 104, or an abnormality has occurred to the internal temperature of water pump 104. The abnormal value of the current of water pump 104 can be detected by providing a current sensor on a power supply line of water pump 104. The internal temperature of water pump 104 can be detected by attaching a temperature sensor in or in the vicinity of water pump 104.

In step S9, when none of the abnormal value of the current of water pump 104 and the abnormal internal temperature of water pump 104 has occurred, the process proceeds to step S14. In step S9, when the abnormal value of the current of water pump 104 or the abnormal internal temperature of water pump 104 has occurred, the process proceeds to step S10 in which the diagnosis that the abnormality has occurred to the performance of water pump 104 is confirmed. This result of diagnosis may be conveyed at this time to an operator, or stored in a nonvolatile memory or the like and later read and analyzed in a repair shop.

In step S11, control device 30 determines whether or not a condition that coolant temperature TW is abnormal (high), rotational speed Np is normal, and flow rate FR is normal is satisfied. "Normal" means for example that the numerical value falls in the range between predetermined upper and lower limits. "High" means that the numerical value is larger than an upper limit of a predetermined normal range.

In the case where the condition in step S11 is satisfied, the process proceeds from step S11 to step S12. Otherwise, the process proceeds to step S15. In step S15, a diagnosis that a failure has occurred is not made, since none of the conditions is satisfied, and the control is returned to the main routine.

In step S12, it is determined whether or not an abnormality has occurred to operation of radiator fan 103 or an abnormal heat generation of inverter 14 has occurred. The abnormal operation of radiator fan 103 can be detected by a comparison between a command value from control device 30 and the detected rotational speed of radiator fan 103. The abnormal heat generation of inverter 14 can be detected based on whether or not temperature TI from temperature sensor 112 incorporated in inverter 14 has exceeded a predetermined threshold value.

In step S12, in the case where none of the abnormal operation of radiator fan 103 and the abnormal heat generation of inverter 14 has occurred, the process proceeds to step S14. In step S12, in the case where one of the abnormal operation of radiator fan 103 and the abnormal heat generation of inverter 14 has occurred, the process proceeds to step S13 in which the diagnosis that the abnormal heat dissipation or abnormal heat generation has occurred is confirmed. This result of diagnosis may be conveyed to an operator at this time or stored in a nonvolatile memory or the like and read and analyzed later in a repair shop.

In the case where the process proceeds to step S14, the diagnosis that another abnormality of the cooling mechanism has occurred (abnormality of the cooling mechanism other than the abnormalities in steps S7, S10, and S13) is confirmed, and the result of diagnosis may be conveyed to an operator at this time, or stored in a nonvolatile memory or the like and later read and analyzed in a repair shop.

As heretofore described, in accordance with the present embodiment, the existing parameters such as the pump's rotational speed and the coolant temperature can be combined with a new parameter, namely the flow rate of the coolant to thereby identify a specific malfunctioning part in the cooling system.

It should be construed that embodiments disclosed herein are by way of illustration in all respects, not by way of limitation. It is intended that the scope of the present invention is defined by claims, not by the description above, and encompasses all modifications and variations equivalent in meaning and scope to the claims.

REFERENCE SIGNS LIST 2 wheel; 10, 13 voltage sensor; 12 voltage converter; 14 inverter; 15 U phase arm; 16 V phase arm; 17 W phase arm; 24 current sensor; 30 control device; 100 vehicle; 102 radiator; 103 radiator fan; 104 water pump; 105 rotation sensor; 106 reservoir tank; 108, 110, 112 temperature sensor; 114 flow rate sensor; C1, CH smoothing capacitor; D1-D8 diode; L1 reactor; MB battery; MG motor generator; PL1, PL2 positive bus; Q1-Q8 IGBT element; SL1, SL2 negative bus; SMRB, SMRG system main relay

The invention claimed is:

1. A cooling system for a vehicle, comprising:
a channel allowing a liquid medium cooling a drive device of the vehicle to circulate;
a flow rate detection unit detecting a flow rate of said liquid medium flowing in said channel;
a temperature sensor detecting a temperature of said liquid medium;
a pump provided on said channel for circulating said liquid medium;
a rotational speed sensor detecting a rotational speed of said pump; and
a control device controlling drive of said pump,
said control device identifying a malfunctioning part of the cooling system based on the flow rate of said liquid medium, the temperature of said liquid medium, and the rotational speed of said pump.

2. The cooling system for a vehicle according to claim 1, wherein in a case where the temperature of said liquid medium and the rotational speed of said pump are normal and the flow rate of said liquid medium is smaller than a normal value, said control device temporarily increases the rotational speed of said pump and, when the flow rate subsequently fails to return to the normal value, said control device identifies said channel as said malfunctioning part.

3. The cooling system for a vehicle according to claim 1, wherein in a case where the temperature of said liquid medium is normal, the rotational speed of said pump is smaller than a normal value, and the flow rate of said liquid medium is smaller than a normal value, said control device identifies said pump as said malfunctioning part.

4. The cooling system for a vehicle according to claim 1, further comprising:
a radiator provided on said channel; and
a fan for blowing air to said radiator, wherein
in a case where the temperature of said liquid medium is abnormal and the rotational speed of said pump and the flow rate of said liquid medium are normal, said control device detects a heat-generation or heat-dissipation abnormality based on an operating state of said fan and an inverter temperature.

* * * * *